Dec. 13, 1949 D. B. EVANS 2,491,304
PLANT THINNING AND CULTIVATING MACHINE
Filed Nov. 3, 1947 4 Sheets-Sheet 1
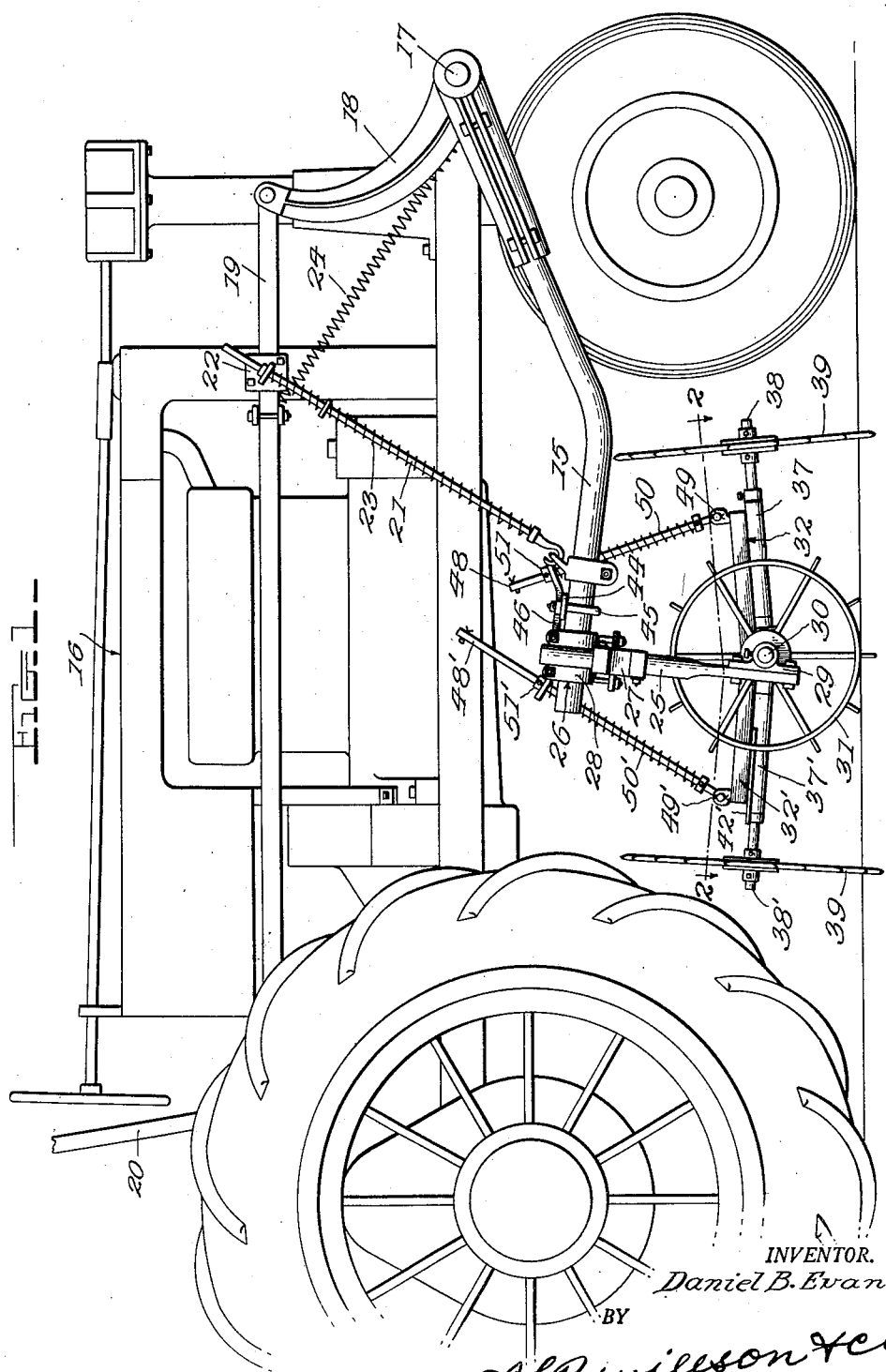
INVENTOR.
Daniel B. Evans
BY
H. B. Willson & Co.
atty

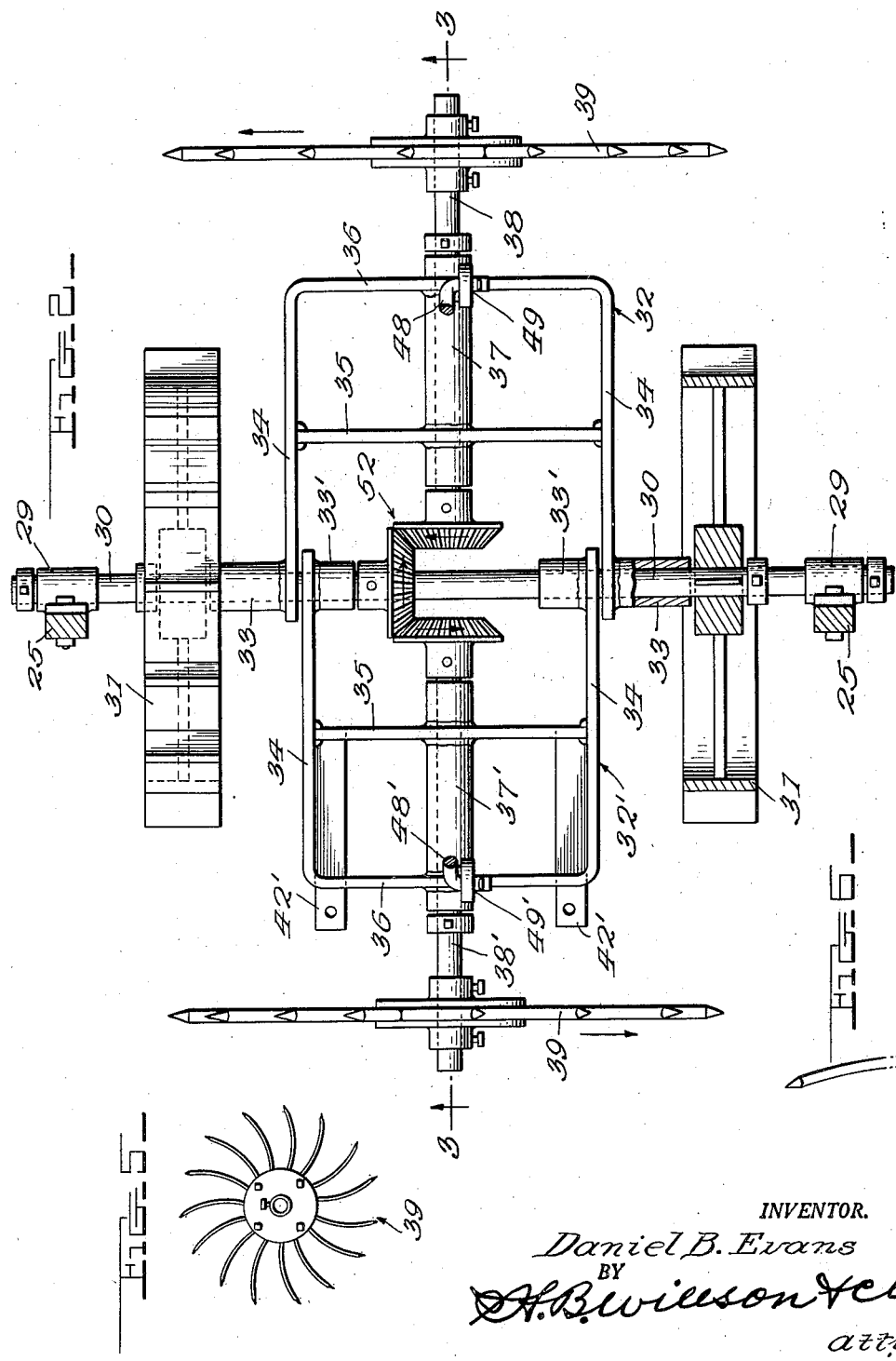

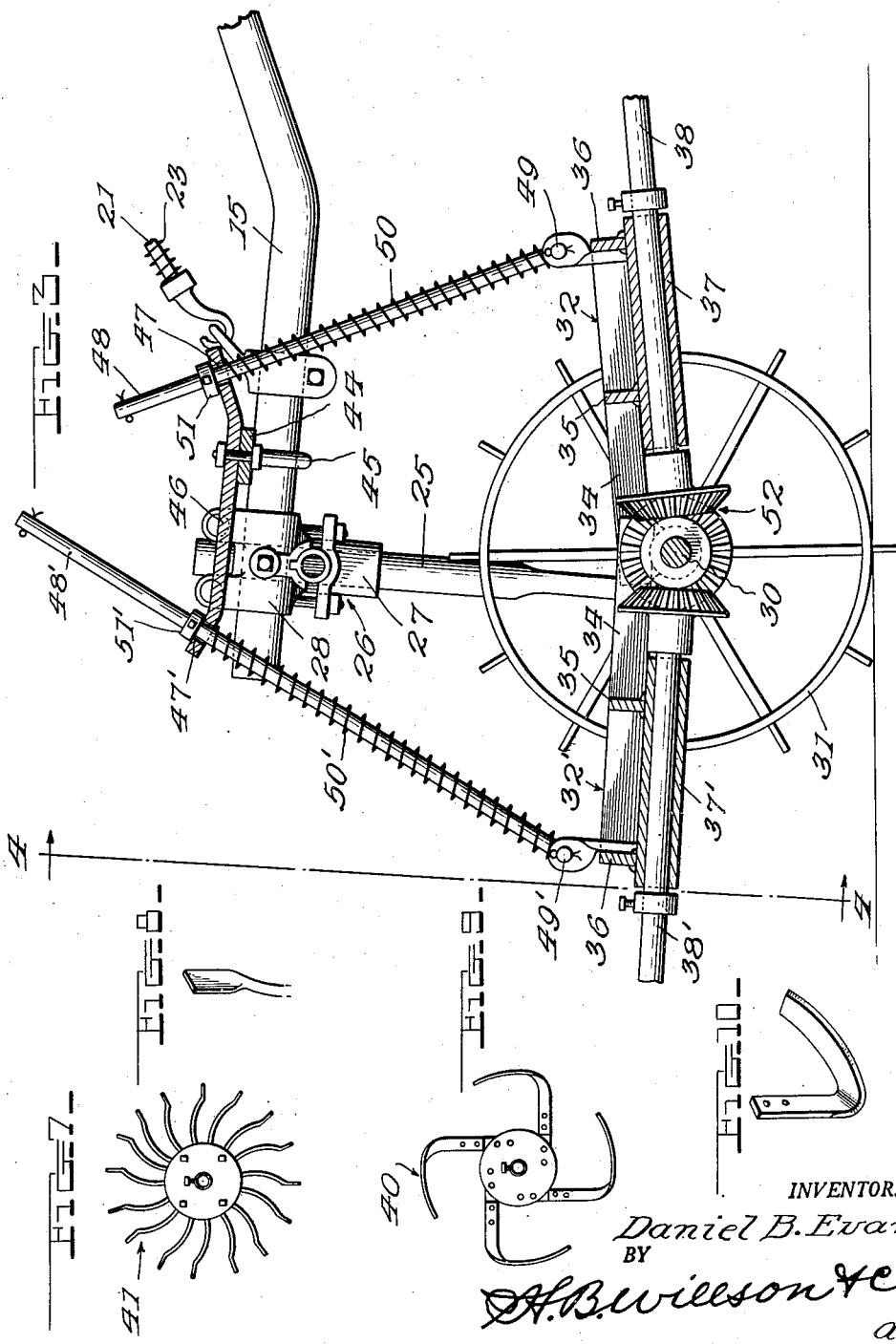

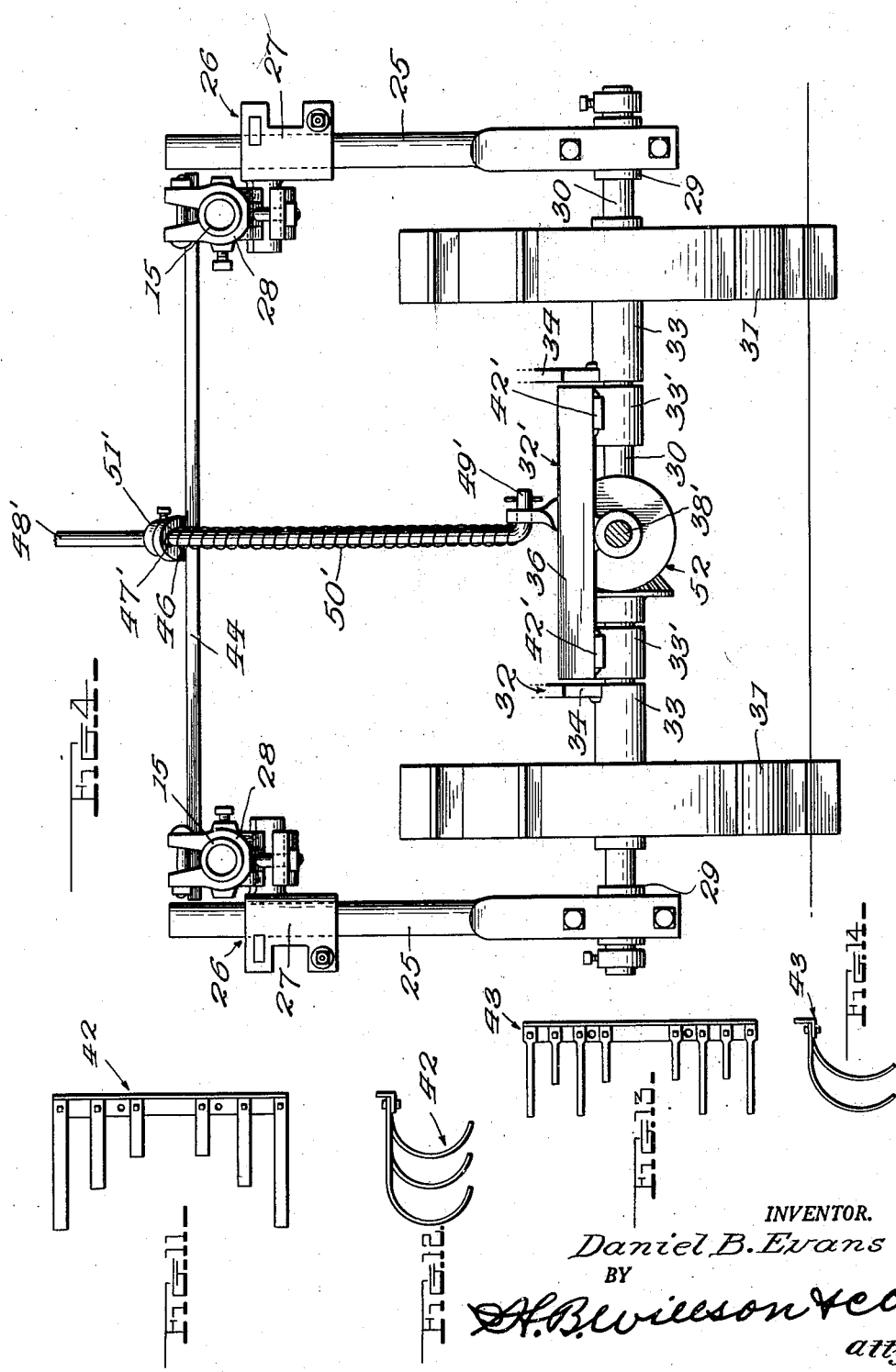

Patented Dec. 13, 1949

2,491,304

UNITED STATES PATENT OFFICE 2,491,304

PLANT THINNING AND CULTIVATING MACHINE

Daniel B. Evans, Bennettsville, S. C.

Application November 3, 1947, Serial No. 783,742

6 Claims. (Cl. 97—15)

The invention aims to provide a new and improved machine for performing such operations as the weeding, thinning, chopping and cultivating of small plants, and while the machine is intended primarily for use in the raising of cotton, it is not restricted to this particular field.

In carrying out the above end, a further object is to provide a novel wheeled attachment readily applicable to implement-mounting draw-bars constituting parts of a conventional cultivating attachment for a tractor, said wheeled attachment embodying requisites for performing desired soil tilling operations.

Another object is to provide a construction which will permit quick and easy changing of tilling implements, as requirements may dictate.

Yet another aim is to provide a novel construction which will be relatively simple and inexpensive, yet efficient and durable.

Figure 1 of the accompanying drawings is a side elevation.

Fig. 2 is a plan view partly in horizontal section as indicated by line 2—2 of Fig. 1.

Fig. 3 is a central vertical longitudinal section on line 3—3 of Fig. 2 but omitting the rotary weeders shown in the preceding views.

Fig. 4 is an end elevation, partly in section, as indicated by line 4—4 of Fig. 3.

Fig. 5 is a side elevation of one of the weeders.

Fig. 6 is a fragmentary perspective view showing one of the prongs of the weeder.

Fig. 7 is a side elevation showing a rotary thinner which may be used.

Fig. 8 is a detail perspective showing the outer end of one of the arms of the thinner.

Fig. 9 is a side elevation showing a chopper which may be used when desired.

Fig. 10 is a perspective view of one of the chopper blades.

Figs. 11 and 12 are respectively, a top plan view and a side elevation showing a straddle-row spring-tooth cultivator which may be connected with the attachment.

Figs. 13 and 14 are respectively a top plan view and a side elevation of a straddle-row spring-tooth weeder which is also connectable with the attachment.

The drawings above briefly described may be considered as disclosing the preferred form of construction but attention is invited to the possibility of making variations within the scope of the invention as claimed.

Two elevated laterally spaced draw-bars 15 are shown forming parts of a cultivating attachment for a tractor 16, the front ends of said draw-bars 15 being swingably mounted upon the usual transverse shaft 17 secured to the front end of the tractor frame. Conventional raising and lowering means is shown for the draw-bars 15, including a crank arm 18; a rod 19 extending rearwardly from the upper end of said crank arm, and a lever 20 to which the rear end of said rod is connected. Rods 21 are connected at their lower ends to the draw-bars 15 and at their upper ends with a clamp 22 on the rod 19, and the coil springs 23 and 24 constituting parts of the conventional cultivating attachment and form no parts of the present invention.

Two substantially vertical posts 25 are adjustably and removably secured at their upper ends to the draw-bars 15, by means of appropriate clamps 26, each of said clamps preferably comprising a vertical portion 27 adjustable upon the post 25, and a horizontal portion 28 adjustable along the draw-bar 15.

The lower ends of the posts 15 are provided with suitable bearings 29 in which an axle 30 is rotatably mounted, said axle having two wheels 31, one of which constitutes a driver for said axle. A front frame section 32 extends forwardly from the axle 30 and is provided at its rear end with bearings 33 mounted upon said axle and mounting said frame section for vertical pivotal movement. A rear frame section 32' extends rearwardly from the axle 30 and the front end of this frame section is provided with bearing 33' upon said axle 30 and mounting said frame section 32' for vertical pivotal movement. Each frame section 32 or 32' preferably is of U-shape in plan view, with the bearings welded or otherwise secured to the free ends of its side arms 34, and these side arms are preferably connected between their ends by a transverse bar 35. Welded or otherwise secured to the two bars 35 and the arm-connecting portions 36 of the U-shaped frame sections 32 and 32' are front and rear bearings 37 and 37' respectively, said bearings being disposed longitudinally of the machine frame. Front and rear shafts 38 and 38' are rotatably mounted in the bearings 37 and 37' respectively and project beyond the outer ends of these bearings, in order that these shafts may carry any of the implements disclosed in the drawings. In Figs. 1 and 2, both of the shafts carry rotary weeders 39, such as that shown in Figs. 5 and 6, but the chopper 40 of Fig. 9 or the thinner 41 of Fig. 7, is also readily applicable to either shaft. A weeder could be well mounted on one of the shafts and a thinner on the other, or two weeders or two thinners could be used at the same time.

Also when the chopper 40 is mounted on one of the shafts, a weeder could be mounted on the other if desired. Furthermore, with any of the rotary implements mounted on the front shaft 38, the rear shaft 38' may be left free of such a rotary implement and instead the cultivator 42 or weeder 43 shown in Figs. 11 and 13, respectively, could be used. To permit attachment of these implements, the rear frame section 32' may well be provided with rearwardly projecting lugs 42'.

Somewhat in advance of the clamps 26, a cross member shown as a bar 44 extends between the draw-bars 15, the ends of said cross bar being secured to said draw-bars by U-bolts or other clamps 45. A short longitudinal element shown as a bar 46 is bolted or otherwise secured to the central portion of the cross bar 44 and projects both forwardly and rearwardly therefrom, the ends of said bar 46 being bent upwardly at obtuse angles and apertured as at 47 and 47' to form front and rear rod guides. Front and rear rods 48 and 48' extend slidably through the openings 47 and 47', the lower ends of said rods being pivotally connected at 49 and 49' with the front and rear frame sections 32 and 32' respectively. Springs 50 and 50' surround the rods 48 and 48' and act downwardly upon the frame sections 32 and 32', said springs reacting against the ends of the bar 46. The upper portions of the rods 48 and 48' carry adjustable collars 51 and 51' to abut the ends of the bar 46. Thus, the springs 50 and 50' hold the frame sections 32 and 32' downwardly to cause the implements to penetrate the earth to the desired extent, and the collars 51 and 51' may be adjusted to limit the downward movement of said frame sections as required.

Appropriate gearing 52 operatively connects the axle 30 with the two shafts 38 and 38' and preferably drives these shafts in opposite directions.

The manner of operating the machine to perform any of the various functions required, will be clear to those skilled in the art, without requiring more extended explanation, and it will be seen that novel and advantageous provision has been made for carrying out the objects of the invention. Attention, however, is again invited to the possibility of making variations within the scope of the invention as claimed.

I claim:

1. In an agricultural machine, a pair of elevated laterally spaced draw-bars, two posts secured at their upper ends to said draw-bars respectively, a wheeled frame connected with the lower ends of said posts and including an implement-carrying frame section mounted for vertical swinging movement, a cross-bar extending between and secured to said draw-bars, a guide carried by said cross-bar, a rod connected at its lower end with said implement-carrying frame and having its upper end portion slidably received in said guide, a spring acting downwardly on said frame section and reacting on said guide, and a stop on said rod to abut said guide and limit the downward movement of said rod and said implement-carrying frame section.

2. A structure as specified in claim 1; in which clamps are provided removably and adjustably securing said posts to said draw-bars, and in which other clamps are provided removably securing said cross-bars to said draw-bars.

3. In an agricultural machine, a pair of elevated laterally spaced draw-bars, two posts secured at their upper ends to said draw-bars respectively, a wheeled frame connected with the lower ends of said posts and including a front implement-carrying frame section and a rear implement-carrying frame section, said frame sections being mounted for independent vertical swinging movement, a cross bar extending between and secured to said draw-bars, a front guide and a rear guide carried by said cross-bar, a front rod and a rear rod connected at their lower ends with said front and rear frame sections respectively and having their upper portions received slidably in said front and rear guides respectively, front and rear springs acting downwardly on said front and rear frame sections respectively and reacting on said front and rear guides respectively, and stops on said rods to abut said guides and limit the downward movement of said rods and said implement-carrying frame sections.

4. A structure as specified in claim 3; including a longitudinal bar secured between its ends to said cross-bar and having apertures in its ends, said apertured bar ends constituting said guides.

5. In an agricultural machine, a wheeled axle having at least one driving wheel, a font frame section extending forwardly from said axle and pivoted thereto for vertical swinging movement, a rear frame section extending rearwardly from said axle and pivoted thereto for vertical swinging movement, a front implement-driving shaft rotatably mounted on said front frame section and projecting forwardly therefrom, a rear implement-driving shaft rotatably mounted on said rear frame section and projecting rearwardly therefrom, gearing connecting said axle with said shafts for driving the latter, two posts having bearings at their lower ends in which said axle is rotatably mounted, two laterally spaced draw-bars to which the upper ends of said posts are secured, a cross-bar extending between and secured to said draw-bars, a front guide and a rear guide carried by said cross-bar, front and rear rods extending slidably through said front and rear guides respectively, the lower ends of said front and rear rods being connected with said front and rear frame sections respectively, front and rear springs acting downwardly on said front and rear frame sections respectively and reacting on said guides, and stops on said rods to abut said guides and limit the downward movement of said rods and frame sections.

6. In an agricultural machine, a wheeled axle having at least one driving wheel, a front frame section extending forwardly from said axle and pivoted thereto for vertical swinging movement, a rear frame section extending rearwardly from said axle and pivoted thereto for vertical swinging movement, a front implement-driving shaft rotatably mounted on said front frame section and projecting forwardly therefrom, a rear implement-driving shaft rotatably mounted on said rear frame section and projecting rearwardly therefrom, gearing connecting said axle with said shafts for driving the latter, a pair of laterally spaced posts having bearings at their lower ends in which the end portions of said shaft are rotatable, a pair of elevated laterally spaced and longitudinally extending draw bars having the rear portions disposed adjacent the upper portions of said posts, a pair of connecting clamps each having a part vertically adjustable on one of said posts and another part longitudinally adjustable on the adjacent draw bar, a transverse member connecting said draw bars adjacent said clamps, said member carrying a longitudinally extending element adjacent its center, spring means for exerting a depressing force on said frame sections and including two springs acting downwardly against said frame sections and reacting against said element, and adjustable stop means associated with said spring means for limiting the depression of said frame sections.

DANIEL B. EVANS.

REFERENCES CITED

The following references are of record in the file of this patent:

UNITED STATES PATENTS

| Number | Name | Date |
|---|---|---|
| 356,424 | Patterson et al. | Jan. 18, 1887 |
| 2,275,446 | Leeper | Mar. 10, 1942 |